(12) United States Patent
Veenstra et al.

(10) Patent No.: US 7,350,604 B2
(45) Date of Patent: Apr. 1, 2008

(54) GASEOUS FUEL SYSTEM FOR AUTOMOTIVE VEHICLE

(75) Inventors: Michael J. Veenstra, Southgate, MI (US); Majed Mohammed, Lasalle (CA); Daniel J. Walesky, Lake Worth, FL (US); Brian C. Moorhead, Willis, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 418 days.

(21) Appl. No.: 10/905,569

(22) Filed: Jan. 11, 2005

(65) Prior Publication Data

US 2005/0193989 A1    Sep. 8, 2005

Related U.S. Application Data

(60) Provisional application No. 60/550,237, filed on Mar. 4, 2004.

(51) Int. Cl.
   *H01M 8/04* (2006.01)

(52) U.S. Cl. .................. 180/65.3; 903/944; 429/24; 429/25

(58) Field of Classification Search ............. 180/65.3, 180/65.8; 701/104; 429/24, 25; 903/944
   See application file for complete search history.

(56) References Cited

U.S. PATENT DOCUMENTS

| | | | |
|---|---|---|---|
| 4,253,428 A | 3/1981 | Billings et al. | |
| 4,570,446 A | 2/1986 | Matsubara et al. | |
| 4,887,556 A | 12/1989 | Gladstone | |
| 5,156,198 A | 10/1992 | Hall | |
| 5,327,990 A | 7/1994 | Busquets | |
| 5,330,031 A | 7/1994 | Hill et al. | |
| 5,383,500 A | 1/1995 | Dwars et al. | |
| 5,410,908 A | 5/1995 | Erichsen | |
| 5,564,306 A | 10/1996 | Miller | |
| 5,605,182 A | 2/1997 | Oberrecht et al. | |
| 5,649,577 A | 7/1997 | Farkas | |
| 5,763,113 A | 6/1998 | Meltser et al. | |
| 5,765,656 A | 6/1998 | Weaver | |
| 5,830,593 A | 11/1998 | Nielson | |
| 6,011,484 A | 1/2000 | Dietl et al. | |
| 6,057,755 A | 5/2000 | Phillips | |
| 6,073,487 A | 6/2000 | Dawson | |
| 6,089,081 A | 7/2000 | Cook et al. | |
| 6,105,697 A | 8/2000 | Weaver | |
| 6,155,099 A | 12/2000 | Kobayashi et al. | |
| 6,156,447 A | 12/2000 | Bette et al. | |

(Continued)

FOREIGN PATENT DOCUMENTS

DE    3303467    9/1983

(Continued)

*Primary Examiner*—Jeff Restifo
(74) *Attorney, Agent, or Firm*—Gary Smith; Dickinson Wright PLLC

(57) ABSTRACT

A gaseous fuel system for an automotive vehicle includes a gaseous fuel storage tank and an associated pressure sensor for monitoring pressurized gas contained within the storage tank. A parameter-driven routine monitors the integrity of the tank by tracking filing cycles marked by the increase of the tank pressure from a first threshold to a second threshold. Mitigation actions may be taken in the event that the filling cycles exceed a predetermined number, or in the event that other system integrity monitoring indicates that mitigation is in order.

22 Claims, 3 Drawing Sheets

U.S. PATENT DOCUMENTS

| | | | |
|---|---|---|---|
| 6,164,123 A | 12/2000 | Corkill | |
| 6,195,999 B1 | 3/2001 | Arnold et al. | |
| 6,202,710 B1 | 3/2001 | Dill et al. | |
| 6,227,037 B1 | 5/2001 | Kawamura et al. | |
| 6,285,179 B1 | 9/2001 | Kubo et al. | |
| 6,293,363 B1 | 9/2001 | Rangaswamy et al. | |
| 6,294,276 B1 | 9/2001 | Ogino | |
| 6,321,593 B1 | 11/2001 | Rich | |
| 6,332,448 B1 * | 12/2001 | Iiyama et al. | 123/304 |
| 6,343,505 B1 | 2/2002 | Cook et al. | |
| 6,354,088 B1 * | 3/2002 | Emmer et al. | 62/50.1 |
| 6,360,835 B1 | 3/2002 | Skala | |
| 6,363,299 B1 | 3/2002 | Hartsell, Jr. | |
| 6,365,289 B1 * | 4/2002 | Lee et al. | 429/13 |
| 6,391,484 B1 | 5/2002 | Keskula et al. | |
| 6,394,207 B1 | 5/2002 | Skala | |
| 6,403,243 B1 | 6/2002 | Herdeg et al. | |
| 6,446,487 B1 | 9/2002 | Van Wesenbeeck et al. | |
| 6,466,842 B1 | 10/2002 | Hartsell, Jr. | |
| 6,488,015 B2 | 12/2002 | Isobe | |
| 6,536,551 B1 | 3/2003 | Tanaka et al. | |
| 6,584,825 B2 | 7/2003 | Pratt et al. | |
| 6,727,013 B2 * | 4/2004 | Wheat et al. | 429/24 |
| 6,964,821 B2 * | 11/2005 | Hirakata | 429/22 |
| 2001/0050189 A1 | 12/2001 | Shimizu | |
| 2002/0011094 A1 | 1/2002 | Cook et al. | |
| 2002/0014277 A1 | 2/2002 | Togasawa et al. | |
| 2002/0027027 A1 | 3/2002 | Skala | |
| 2002/0078736 A1 | 6/2002 | Cook et al. | |
| 2002/0094467 A1 | 7/2002 | Nonobe et al. | |
| 2002/0100314 A1 | 8/2002 | Docy et al. | |
| 2002/0114984 A1 | 8/2002 | Edlund et al. | |
| 2002/0157655 A1 | 10/2002 | Streib | |
| 2002/0160243 A1 | 10/2002 | Ueda et al. | |
| 2002/0162601 A1 | 11/2002 | Jin et al. | |
| 2002/0162698 A1 | 11/2002 | Oglesby et al. | |
| 2002/0163200 A1 | 11/2002 | Oglesby et al. | |
| 2002/0164515 A1 | 11/2002 | Oglesby et al. | |
| 2002/0182454 A1 | 12/2002 | Autenrieth et al. | |
| 2002/0189872 A1 | 12/2002 | Hasuka et al. | |
| 2002/0189873 A1 | 12/2002 | Mizuno | |
| 2002/0198636 A1 | 12/2002 | Uenodai et al. | |
| 2003/0000758 A1 | 1/2003 | Bruck et al. | |
| 2003/0008185 A1 | 1/2003 | Sugino et al. | |
| 2003/0015022 A1 | 1/2003 | Stegmann et al. | |
| 2003/0022039 A1 | 1/2003 | Lloyd et al. | |
| 2003/0022042 A1 | 1/2003 | Wells et al. | |
| 2003/0022044 A1 | 1/2003 | Inai et al. | |
| 2003/0022045 A1 | 1/2003 | Wells et al. | |
| 2003/0029224 A1 | 2/2003 | Pratt et al. | |
| 2003/0037981 A1 | 2/2003 | Scholer et al. | |
| 2003/0039869 A1 | 2/2003 | Murakami et al. | |
| 2003/0062210 A1 | 4/2003 | Farmer | |
| 2003/0071446 A1 | 4/2003 | Harderer et al. | |
| 2003/0072984 A1 | 4/2003 | Saloka et al. | |
| 2003/0077495 A1 | 4/2003 | Scartozzi et al. | |
| 2003/0082428 A1 | 5/2003 | Boneberg et al. | |
| 2003/0083848 A1 | 5/2003 | Kami | |
| 2003/0091503 A1 | 5/2003 | Rosenfeld et al. | |
| 2003/0110836 A1 | 6/2003 | Cho | |
| 2004/0166388 A1 * | 8/2004 | Wheat et al. | 429/24 |
| 2005/0061371 A1 * | 3/2005 | Kimbara et al. | 137/266 |
| 2005/0103400 A1 * | 5/2005 | Eichelberger et al. | 141/231 |
| 2007/0023215 A1 * | 2/2007 | Ueda | 180/167 |

FOREIGN PATENT DOCUMENTS

| | | |
|---|---|---|
| DE | 19620873 | 11/1997 |
| EP | 1279940 | 1/2003 |
| JP | 2003569 | 1/1990 |
| JP | 8031436 | 2/1996 |

* cited by examiner

GASEOUS FUEL SYSTEM FOR AUTOMOTIVE VEHICLE

This application claims the benefit of U.S. Provisional Application No. 60/550,237 filed Mar. 4, 2004.

BACKGROUND OF THE INVENTION

1. Field of the Invention

The present invention relates to a gaseous fuel storage and transfer system for use in an automotive vehicle.

2. Disclosure Information

Gaseous fuel storage and supply systems for automotive vehicles present unique challenges to automotive designers, inasmuch as such fuel systems require the handling of gases under relatively high pressures, as opposed to the modest pressures associated with the handling of liquid fuels such as gasoline and Diesel fuel. Furthermore, certain compressed gases such as hydrogen and natural gas present the additional challenge that such gases are buoyant, as opposed to the lack of buoyancy generally present with vapors generated by liquid hydrocarbon fuels. In addition, hydrogen is not only buoyant, but also odorless and has a smaller molecular size, as compared with vapors generated by liquid hydrocarbon fuels. All of these characteristics render compressed fuel gases more difficult to store.

The need to store compressed gases under relatively high pressure and automotive safety requirements impose an added round of complexity in the design process associated with automotive vehicles because fuel tanks for such gases must have much greater strength than liquid storage tanks, to accommodate much higher pressures. Moreover, the useful life of such pressure vessels must be monitored to assure that an adequate margin of safety is maintained, while at the same time allowing onboard tanks to be filled to their maximum safe and practicable (operation limit) capacity, to meet vehicle range design expectations.

Compressed gas storage tank monitoring systems generally use valving arrangements which are usually grossly biased towards underfilling, with the result that the energy density available with such tank systems has generally not been satisfactory, with the obvious negative impact upon vehicle range.

The system and method according to present invention allows maximum practicable filling of compressed gas tanks, while monitoring the useful life of the tank so as to allow tank integrity to be maintained in an efficient manner.

SUMMARY OF INVENTION

A gaseous fuel system for an automotive vehicle includes a gaseous fuel storage tank and sensors for monitoring the pressure and temperature of gas contained within the storage tank. The pressure sensor generates a gas pressure signal corresponding to the tank pressure. An electronic control unit (hereinafter referred to as a controller) receives the gas pressure signal and other sensor signals and initiates mitigation actions based on a predefined imbedded algorithm designed to maximize the applicable range of the fuel system, while meeting all other design requirements. In a first example, the controller records each filling cycle wherein the gas pressure signal indicates that the pressure within the storage tank has been increased from below a first threshold value to a value or reading in excess of a second threshold value. The controller initiates mitigation in the event that the number of recorded filling cycles exceeds a predetermined number of cycles. Mitigation may include limiting the pressure to which the storage tank may be filled, or limiting the quantity of compressed gaseous fuel which may be introduced into the storage tank. Other mitigation actions, such as terminating tank refueling, may be initiated by the controller in the event that the pressure of the stored gas, the temperature of the stored gas, or the temperature of the fuel storage tank exceeds predetermined threshold values. Thus, as used herein, the term "mitigation" means limiting either the amount of fuel within the gaseous fuel storage tank, or the pressure of the fuel within the storage tank, or the pressure of the fuel within the storage tank during refueling, or subsequent to refueling, or stopping the fueling and accordingly, limiting the quantity of fuel in the tank in the event that one or more specified operating parameters exceeds a predetermined threshold value.

According to another aspect of the present invention, the controller determines the quantity of fuel within the storage tank as a function of at least the temperature and pressure of the gas stored in the tank. This information may be used in mitigation actions, or may be used directly or indirectly, as by yet another controller within the vehicle, to drive the vehicle's fuel gauge.

A gaseous fuel system according to the present invention further includes a fill valve connected with the fuel storage tank and operated by the controller, as well as a transmission range sensor which is also connected with the controller, such that the controller prevents filling of the fuel system unless the transmission range sensor indicates that the vehicle's transmission is in the 'park' range. The present fuel system also includes a number of fugitive fuel gas sensors which are operatively connected with the controller such that the controller will close the fill valve in the event of a fugitive fuel gas leak during a refueling event.

The present fuel system also includes a fuel transfer line extending from the storage tank to a prime mover. The fuel transfer line includes a fuel pressure sensor connected with the controller. The controller tracks the pressure within the transfer line when fuel is not being withdrawn from the storage tank, and in this manner monitors the integrity of the fuel transfer line and associated valves.

The fill valve for the fuel storage tank may have a variable fill orifice operated by the controller so as to control the rate of fuel being introduced into the storage tank.

Filling of the storage tank to its maximum practicable capacity is aided by a communication link embedded in the controller for providing a fuel filler station with a contemporary value of at least one fuel fill parameter. This parameter may be, for example, the maximum pressure to which a fuel tank is to be filled, or the maximum mass quantity of fuel to be placed into the fuel tank.

According to another aspect of the present invention, a prime mover installed in an automotive vehicle with the present fuel system may include at least one rotating machine and an associated transmission. The rotating machine may be a reciprocating internal combustion engine, or an electric motor powered by a fuel cell operated with the gaseous fuel from the fuel storage tank, or other types of rotating machines known to those skilled in the art and suggested by this disclosure.

The previously described fill valve may be equipped with a sensor for detecting the presence of a filler nozzle and for sending a refueling signal to the controller, with the controller preventing movement of the vehicle in the event that the refueling signal is present.

According to another aspect of the present invention, a method for monitoring the operating condition of the gaseous fuel storage system and an associated prime mover includes the steps of monitoring the number of filling cycles of the gaseous fuel storage tank by recording each instance in which the gas pressure within the tank is increased from a first threshold value to a second threshold value, and monitoring the integrity of a fuel transfer line extending from the storage tank to the prime mover by tracking the pressure within the transfer line when fuel is not being withdrawn from the storage tank. Finally, the present method includes initiating mitigation in the event that either the number of filling cycles exceeds a predetermined number, or in the alternative event that the tracked pressure within the fuel transfer line decreases at a rate in excess of a predetermined maximum permissible rate.

According to another aspect of the present invention, a controller operatively connected with a plurality of sensors includes a parameter-driven routine using as input data at least the output of a pressure sensor associated with the gaseous fuel storage tank, for monitoring the operating condition of the fuel storage tank.

It is an advantage of the present system and method that a vehicle fueled with compressed gas may be operated for a maximum allowable range with efficiency, while monitoring the integrity of the fuel tank and associated fuel transfer lines.

It is a further advantage of the present invention that both hydrogen and compressed natural gas may be handled by the present system with minimal hardware changes when switching from one fuel to another.

It is a further advantage of the present invention that the present system facilitates filling of the compressed gas storage tank with electronically controlled, or robotic, filling station equipment.

Other advantages, as well as features and objects of the present invention, will become apparent to the reader of this specification.

DETAILED DESCRIPTION OF PREFERRED EMBODIMENTS

Figure 1:
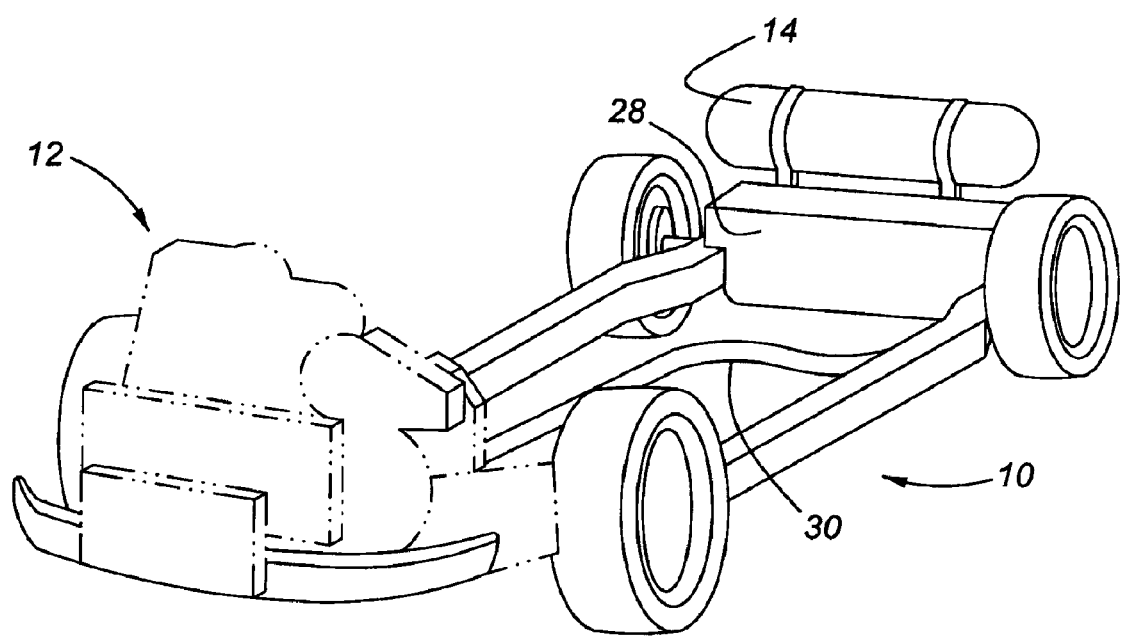
FIG. 1 is a perspective view of a vehicle chassis according to one aspect of the present invention.

As shown in FIG. 1, vehicle 10 has compressed fuel tank 14, which may hold either natural gas, or hydrogen, or some other compressed fuel gas. Fuel is provided via fuel transfer line 30 to prime mover 12. As noted above, prime mover 12 may comprise either a fuel cell or an internal combustion engine, or yet other types of compress gaseous fuel-using prime movers known to those skilled in the art and suggested by this disclosure.

Figure 2:
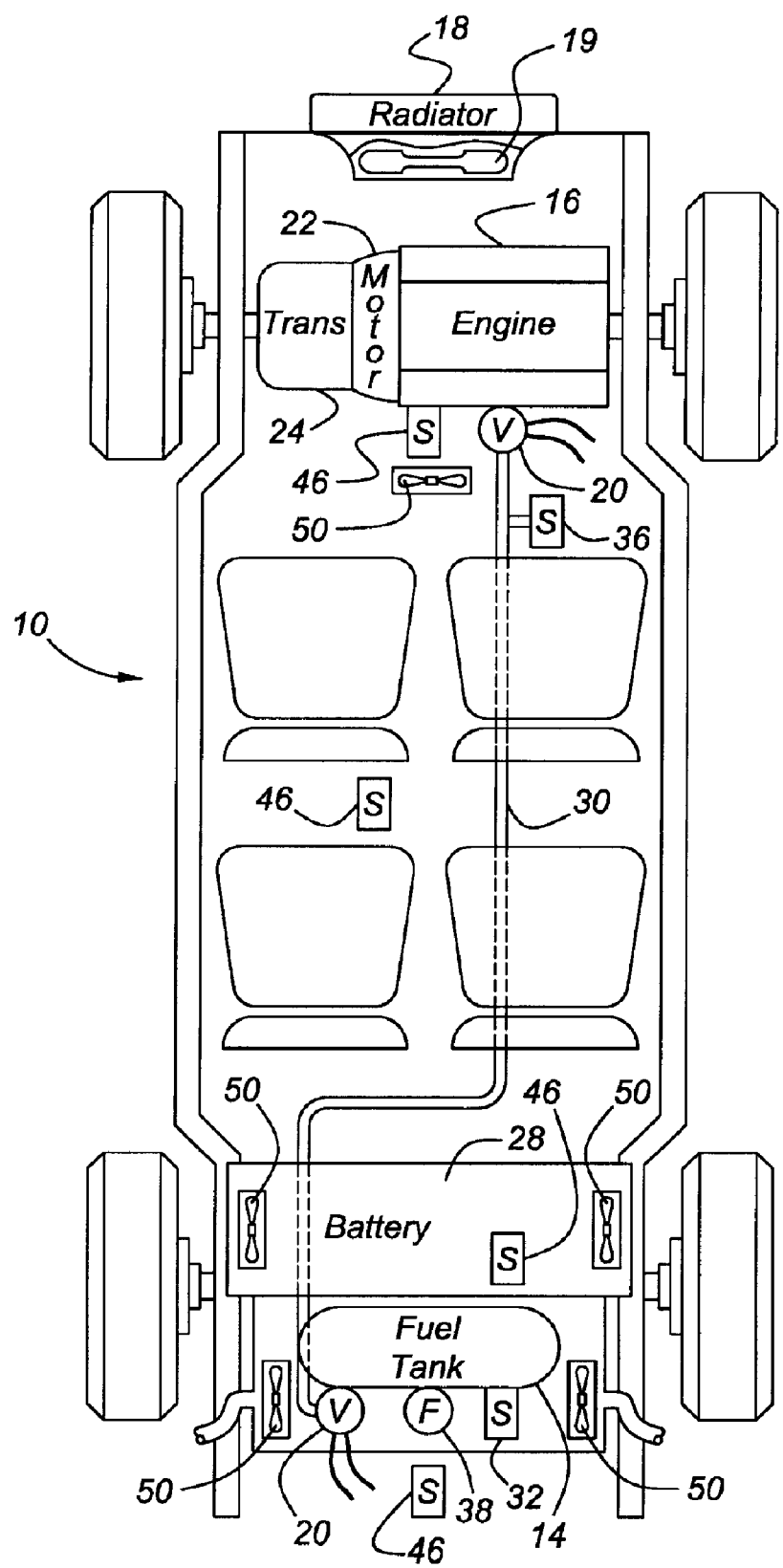
FIG. 2 is a plan view of the vehicle chassis of FIG. 1, showing other aspects of the present invention.

FIG. 2 shows additional details of a vehicle and fuel system according to the present invention. Thus, a first type of prime mover includes engine 16, which is cooled by radiator 18 and circulating fan 19, is coupled to traction motor 22 and transmission 24. Engine 16 receives fuel from tank 14 by means of fuel transfer line 30. Flow of fuel through fuel transfer line 30 is controlled by means of fuel valves 20 which are located between fuel transfer line 30 and fuel tank 14, as well as between fuel transfer line 30 and engine 16. Although engine 16 is shown in FIG. 2, those skilled in the art will appreciate in view of this disclosure that engine 16 could be replaced by a fuel cell operating on natural gas, or hydrogen, or other fuel gases. Such detail is left to those wishing to practice the present invention.

A number of sensors are used about vehicle 10 for a variety of purposes. Thus, tank pressure sensor 32 measures the pressure of fuel within fuel tank 14. A number of fugitive fuel gas sensors 46 are located at the rear of vehicle 10, as well as in the compartment in which fuel tank 12 is located, and also in the engine compartment and passenger cabin of vehicle 10. Fuel gas sensors 46 provide inputs to controller 42 regarding fugitive gas events, which will be discussed in connection with FIG. 3.

Vehicle 10 also includes a number of air circulators 50 which are located in proximity to fuel tank 14, as well as in proximity to traction battery 28, and in passenger compartment 50. Air circulators 50 are used to disperse fugitive gas emissions detected by sensors 46. Those skilled in the art will appreciate in view of this disclosure that traction battery 28 and fuel tank 14 could each encompass a wide variety of configurations within a system according to the present invention.

Figure 3:
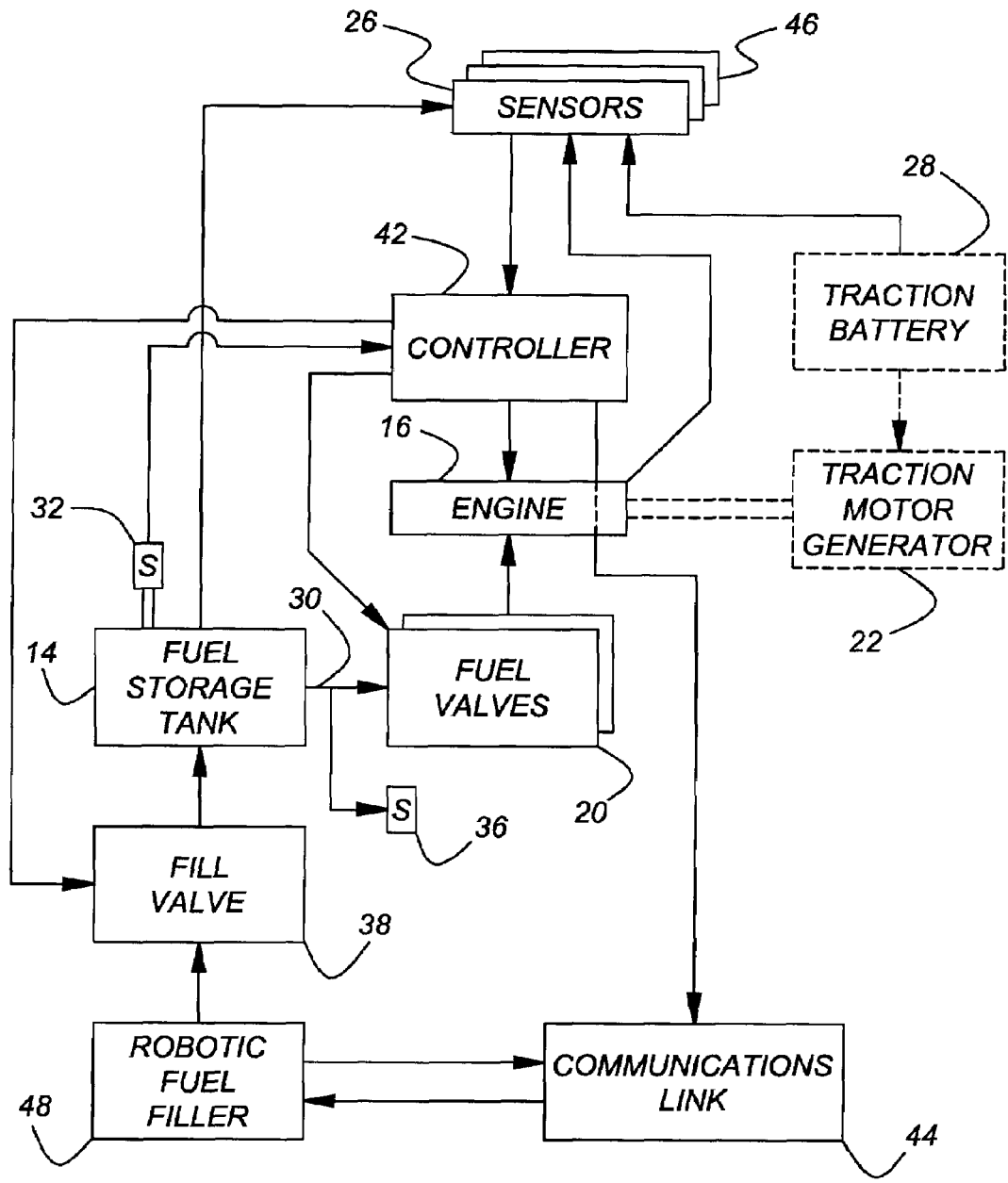
FIG. 3 is a block diagram showing various parts of a vehicle fuel system and powertrain according to the present invention.

FIG. 3 illustrates the relationship between vehicle controller 42 and number of vehicular components, including a several generic sensors, 26, which correspond to both the sensors shown in FIG. 2, and to additional sensors, including but not limited to sensors for measuring the temperature of fuel storage tank 14, and other system temperature and pressure sensors.

Controller 42 continuously monitors the pressure within fuel storage tank 14 through its operative connection with tank pressure sensor 32. Controller 42 records each filling cycle which it detects as having occurred whenever the gas pressure within storage tank 14 is increased from below a first threshold value, corresponding to the a depleted pressure level within tank 14, to a second threshold value, corresponding to a filled value of tank 14, such as 4,000 psi or some other predetermined value. Because each filling cycle subjects the tank to potentially detrimental stresses, controller 42 records all such fill cycles so that when a predetermined number of cycles has been reached, the filling of the tank will be limited in terms of the maximum pressure achieved or the maximum quantity of fuel allowed to be introduced into the tank, until the tank has either been recertified or replaced.

Controller 42 also prevents unintended vehicle motion and other extraneous activities during refueling of tank 14. Thus, one of sensors 26 includes a transmission range sensor. In the event that the range sensor indicates that transmission 24 is not in the 'park' position, controller 42 will prevent fuel fill valve 38 from opening.

Controller 42 will prevent starting of engine 16 when fill valve 38 indicates that vehicle 10 is being refueled. In order to permit this, fill valve 38 is equipped with a sensor, drawn from several sensors known to those skilled in the art, for determining the presence of a fill nozzle (not shown) incorporated in either an electronically controlled fuel filler, 48, or in a manual fuel filler. In this manner, controller 42 will prevent vehicle 10 from moving if the vehicle is being refilled. Also during refueling, in the event that fugitive fuel gas sensors 46 sense the presence of gas, controller 42 will close fuel fill valve 38, thereby preventing refueling. Fuel valves 20 will also be kept in a closed position, so as to prevent engine 16 from starting.

Controller 42 also monitors the condition of fuel transfer line 30 by closing fuel valves 20, shown in FIG. 2, and by monitoring and tracking the pressure within fuel transfer line 30 by means of fuel transfer line pressure sensor 36, when the vehicle is in a "park" mode or in some other mode when no fuel is being consumed by prime mover 12.

Fuel valve 38 may be equipped with a variable fill orifice of the type known to those skilled in the art and suggested by disclosure and operated by controller 42, so as to allow faster filling by operating at maximum practicable filling capacity during the fill cycle.

FIG. 3 shows communication link 44 which is embedded in controller 42 and which communicates with either fuel filler 48, or with a manual fuel filler. Communication link 44 may employ an electrical connection, or a radio frequency, or infrared, or fiber optic, or magnetic, or ultrasonic communication system of the types known to those skilled in the art and suggested by this disclosure. In any event, communication link 44 allows filler 48, or a manual filler, to achieve a maximum possible fill of fuel storage tank 14 by advising robotic fuel filler 48 of at least one fuel fill parameter, which is preferably a maximum pressure to which fuel tank 12 is to be filled. This will permit the present system to avoid a situation sometimes encountered with conventional compressed gas filling systems in which fill pressures are deliberately kept at a very conservative level due to concerns about the integrity of onboard tanks. Because controller 42 monitors the integrity of the tank and transfer line system by monitoring the number of fill cycles, as well as other safety related aspects of the refilling process, higher fill pressures are possible, with an attendant increase in vehicle range.

According to another aspect of the present invention, a parameter-driven routine or method for monitoring the operating condition of a gaseous fuel storage system and an associated prime mover includes the steps of monitoring the number of filling cycles using controller 42 and tank pressure sensor 32, and monitoring the integrity of fuel transfer line 30 extending between tank 14 and prime mover 12 by tracking the pressure within transfer line 30 when fuel is not being withdrawn from storage tank 14. The present method further includes initiating mitigation in the event that the number of filling cycles exceeds a predetermined number, or in the further event that tracked pressure within fuel transfer line 30 decreases at a rate in excess of a predetermined maximum permissible rate. As described above, the mitigation may include limiting the subsequent filling of the tank, or limiting discharge of fuel from tank 12 into fuel transfer line 30.

The present system offers the advantage of a parameter-driven routine for monitoring the operating condition of the fuel storage tank, so as to maximize the capacity usage of the tank while maintaining the integrity of the tank and fuel transfer line extending from the tank to the vehicle's prime mover.

Although the present invention has been described in connection with particular embodiments thereof, it is to be understood that various modifications, alterations, and adaptations may be made by those skilled in the art without departing from the spirit and scope of the invention set forth in the following claims.

What is claimed is:

1. A gaseous fuel system for an automotive vehicle, comprising:
   a gaseous fuel storage tank;
   a pressure sensor for monitoring the pressure of gas contained within said storage tank and for generating a gas pressure signal corresponding to said pressure;
   a controller for receiving said gas pressure signal and for recording each filling cycle wherein said pressure signal indicates that the pressure within said storage tank has been increased from below a first threshold value to a value above a second threshold value, with said controller initiating mitigation in the event that the number of recorded filling cycles exceeds a predetermined number of cycles.

2. A gaseous fuel system according to claim 1, wherein said mitigation comprises limiting the pressure to which the storage tank may be filled.

3. A gaseous fuel system according to claim 1, wherein said mitigation comprises limiting the quantity of compressed fuel which may be introduced into the storage tank.

4. A gaseous fuel system according to claim 1, wherein said controller initiates mitigation in the event that at least one of the pressure of the stored gas, the temperature of the stored gas, and the temperature of said fuel storage tank exceed predetermined threshold values.

5. A gaseous fuel system according to claim 1, wherein said controller determines the quantity of fuel within said storage tank as a function of at least the temperature and pressure of the gas stored in the tank.

6. A gaseous fuel system according to claim 1, further comprising a fill valve connected with said fuel storage tank and with said controller, with said controller further being connected to a transmission range sensor such that said controller prevents filling of said fuel system unless said transmission sensor indicates that a vehicle transmission is in a park range.

7. A gaseous fuel system according to claim 1, further comprising a fill valve connected with said fuel storage tank and with said controller, with said controller further being connected with a plurality of fugitive fuel gas sensors, and with said controller closing said fill valve in the event that the presence of fugitive fuel gas is detected by at least one of said sensors during refueling.

8. A gaseous fuel system according to claim 1, further comprising a fuel transfer line extending from said storage tank to a prime mover, with said transfer line having a fuel pressure sensor connected with said controller, with said controller tracking the pressure within said transfer line when fuel is not being withdrawn from said storage tank.

9. A gaseous fuel system according to claim 1, further comprising a fill valve having a variable fill orifice operated by said controller.

10. A gaseous fuel system according to claim 1, further comprising a communication link embedded in said controller for advising an electronically controlled fuel filler of at least one fuel fill parameter.

11. A gaseous fuel system according to claim 10, wherein said controller and said communication link advise said electronically controlled fuel filler as to the maximum pressure to which said fuel tank is to be filled.

12. An automotive vehicle comprising:
   a gaseous fuel storage tank containing a quantity of compressed gas;
   a prime mover comprising at least one rotating machine and an associated transmission, with said prime mover being fueled by gaseous fuel from said fuel storage tank;
   a pressure sensor for monitoring the pressure of gas contained within said storage tank and for generating a gas pressure signal corresponding to said pressure; and
   a controller for receiving said gas pressure signal and for recording each filling cycle wherein said pressure signal indicates that the pressure within said storage tank is increased from below a first threshold value to a level above a second threshold value, with said controller initiating mitigation in the event that the number of recorded filling cycles exceeds a predetermined number of cycles.

13. An automotive vehicle according to claim 12, further comprising a fill valve connected with said fuel storage tank, with said fill valve having a sensor for detecting the presence of a fill nozzle and for sending a refueling signal to said controller, and with said controller preventing movement of said vehicle in the event that said refueling signal is present.

14. An automotive vehicle according to claim 12, wherein said prime mover comprises a reciprocating internal combustion engine and an associated transmission.

15. An automotive vehicle according to claim 12, wherein said prime mover comprises a fuel cell, and electrodrive motor, and an associated transmission.

16. An automotive vehicle according to claim 12, wherein said compressed gas comprises natural gas.

17. An automotive vehicle according to claim 12, wherein said compressed gas comprises hydrogen.

18. A method for monitoring the operating condition of a gaseous fuel storage system and an associated prime mover, comprising the steps of:
    monitoring the number of filling cycles of a gaseous fuel storage tank by recording each instance in which the gas pressure within the tank is increased from below a first threshold value to a value above a second threshold value;
    monitoring the integrity of a fuel transfer line extending from said storage tank to said prime mover by tracking the pressure within said transfer line when fuel is not being withdrawn from said storage tank; and
    initiating mitigation in the event that either the number of filling cycles exceeds a predetermined number, or in the event that the tracked pressure within said fuel transfer line decreases at a rate in excess of a predetermined maximum permissible rate.

19. A method according to claim 18, wherein said mitigation comprises the step of limiting the maximum filling pressure of said storage tank in the event that said predetermined number of filling cycles has been exceeded.

20. A method according to claim 18, wherein said mitigation comprises the step of limiting the discharge of gas from said storage tank into said fuel transfer line in the event that said tracked pressure decreases at a rate in excess of said predetermined maximum permissible rate.

21. A gaseous fuel system for an automotive vehicle, comprising:
    a gaseous fuel storage tank;
    a plurality of sensors for determining the values of a plurality of operating parameters of said gaseous fuel system, with said sensors including at least a pressure sensor for determining the gas pressure within said storage tank;
    a controller operatively connected with said plurality of sensors, with said controller comprising a parameter-driven routine, using as input data at least the output of said pressure sensor, for monitoring the operating condition of said fuel storage tank; and
    wherein said controller monitors the useful life of said storage tank by recording each filling cycle wherein the output of said pressure signal indicates that the pressure within said storage tank has been increased from a first threshold value to a second threshold value.

22. A gaseous fuel system according to claim 21, wherein said controller initiates mitigation in the event that the number of recorded filling cycles exceeds a predetermined number of cycles.

* * * * *